(12) United States Patent
Sonobe et al.

(10) Patent No.: US 12,246,772 B2
(45) Date of Patent: Mar. 11, 2025

(54) AUTOMOBILE SUSPENSION STRUCTURE

(71) Applicant: NIPPON STEEL CORPORATION, Tokyo (JP)

(72) Inventors: Soma Sonobe, Tokyo (JP); Naoki Kimoto, Tokyo (JP); Takeshi Kawachi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/569,921

(22) PCT Filed: Aug. 19, 2021

(86) PCT No.: PCT/JP2021/030366
§ 371 (c)(1),
(2) Date: Dec. 13, 2023

(87) PCT Pub. No.: WO2023/021654
PCT Pub. Date: Feb. 23, 2023

(65) Prior Publication Data
US 2024/0278836 A1    Aug. 22, 2024

(51) Int. Cl.
B62D 21/11    (2006.01)
B60G 7/02     (2006.01)
B62D 21/15    (2006.01)

(52) U.S. Cl.
CPC ............ *B62D 21/11* (2013.01); *B60G 7/02* (2013.01); *B62D 21/155* (2013.01); *B60G 2206/604* (2013.01)

(58) Field of Classification Search
CPC ...... B62D 21/11; B62D 21/155; B62D 21/00; B62D 21/02; B62D 25/08; B60G 2206/604; B60G 7/02

USPC .................................................. 280/124.11
See application file for complete search history.

(56) References Cited

U.S. PATENT DOCUMENTS

2014/0300137 A1    10/2014  Komiya

FOREIGN PATENT DOCUMENTS

| CN | 201520178 U | * | 7/2010 | |
| CN | 104554444 A | * | 4/2015 | ............ B62D 21/02 |
| CN | 206358218 U | * | 7/2017 | |
| CN | 209426856 U | * | 9/2019 | |
| CN | 209634569 U | * | 11/2019 | |
| CN | 211731553 U | * | 10/2020 | |

(Continued)

*Primary Examiner* — Keith J Frisby
(74) *Attorney, Agent, or Firm* — Birch, Stewart, Kolasch & Birch, LLP

(57) ABSTRACT

An automobile suspension structure includes: a subframe; a first link; and a second link, in which the subframe includes: a pair of side members; a pair of cross members; and a link attachment part, the link attachment part is arranged to be continuous with an end of the cross member, the link attachment part includes: a first link attachment part; and a second link attachment part, the link attachment part is joined to an upper surface and a lower surface of the side member in an automobile height direction and an outer surface of the side member in an automobile width direction, the first link attachment part and the second link attachment part are arranged with the side member sandwiched therebetween in the automobile height direction, the first link is attached to the first link attachment part, and the second link is attached to the second link attachment part.

3 Claims, 8 Drawing Sheets

(56) References Cited

FOREIGN PATENT DOCUMENTS

| | | | | |
|---|---|---|---|---|
| CN | 212605440 | U | * | 2/2021 |
| CN | 112590935 | A | * | 4/2021 |
| JP | 2005-255067 | A | | 9/2005 |
| JP | 2005262924 | A | * | 9/2005 |
| JP | 2007022500 | A | * | 2/2007 |
| WO | WO 2013/069294 | A1 | | 5/2013 |

* cited by examiner

AUTOMOBILE SUSPENSION STRUCTURE

TECHNICAL FIELD

The present invention relates to an automobile suspension structure.

BACKGROUND ART

Due to the tightening of fuel efficiency regulations in recent years, achieving both the weight reduction of an automobile body and the improvement of collision performance has been required, and each part that forms the automobile body has been becoming stronger and thinner. However, simply replacing the materials of each part with high-strength, thin-plate materials raises concerns about a decrease in rigidity, and therefore, it is desirable to respond to the requirement for weight reduction by improving the shape and structure of each part as well as increasing the strength of the materials. Further, for example, suspension parts such as a subframe for attaching a suspension to the automobile body cause deterioration of ride quality and driving stability due to the decrease in rigidity, and therefore, not only the weight reduction but also the rigidity improvement is required. In particular, the rigidity of the subframe directly affects the ride quality, and thus, the above measures are urgently needed.

As an automobile suspension structure, Patent Document 1 has disclosed a suspension cross member of an automotive vehicle including a pair of side members and a cross member connected to a pair of the side members. The suspension cross member described in Patent Document 1 is designed to reduce vibration from a road surface and improve rigidity by filling some regions of the side members with a foaming agent.

PRIOR ART DOCUMENT

Patent Document

Patent Document 1: Japanese Laid-open Patent Publication No. 2005-255067

SUMMARY OF THE INVENTION

Problems to be Solved by the Invention

FIG. 1 is a perspective view illustrating an outline of a conventional automobile suspension structure. FIG. 2 is a view illustrating a periphery of a conventional link attachment part, where a subframe is cut across an automobile length direction (X direction). In the conventional suspension structure, there was room for improvement in rigidity against torsional deformation (deformation in the direction of the arrow in FIG. 2) or local deformation of a link attachment part 90 about the axis in the automobile length direction when a lateral force (force in the automobile width direction) is applied.

The present invention has been made in consideration of the above-described circumstances, and its object is to improve the rigidity of an automobile suspension structure.

Means for Solving the Problems

One aspect of the present invention to solve the above-described problems is an automobile suspension structure, the structure including: a subframe; a first link; and a second link, in which the subframe includes: a pair of side members; a pair of cross members arranged between a pair of the side members; and a link attachment part, the link attachment part is arranged to be continuous with an end of the cross member, the link attachment part includes: a first link attachment part; and a second link attachment part, the link attachment part is joined to an upper surface and a lower surface of the side member in an automobile height direction and an outer surface of the side member in an automobile width direction, the first link attachment part and the second link attachment part are arranged with the side member sandwiched therebetween in the automobile height direction, the first link attachment part and the second link attachment part are connected via the link attachment part joined to the outer surface of the side member in the automobile width direction, the first link is attached to the first link attachment part so as to be pivotable in a plane across an automobile length direction, and the second link is attached to the second link attachment part so as to be pivotable in a plane across the automobile length direction.

Effect of the Invention

According to the present invention, it is possible to improve the rigidity of an automobile suspension structure.

EMBODIMENTS FOR CARRYING OUT INVENTION

Figure 1:
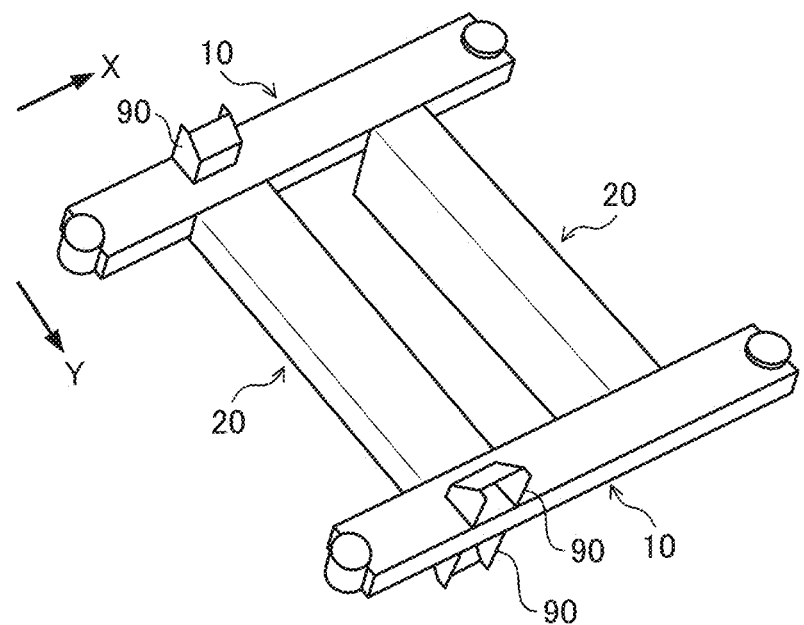
FIG. 1 is a perspective view illustrating an outline of a conventional automobile suspension structure.

Hereinafter, there will be explained an embodiment of the present invention referring to the drawings. Incidentally, in this description and the drawings, the same codes are given to the components having substantially the same functional configurations to omit duplicated explanations. In this description and the drawings, the "X direction" is an automobile length direction, the "Y direction" is an automobile width direction, and the "Z direction" is an automobile height direction.

First Embodiment

Figure 3:
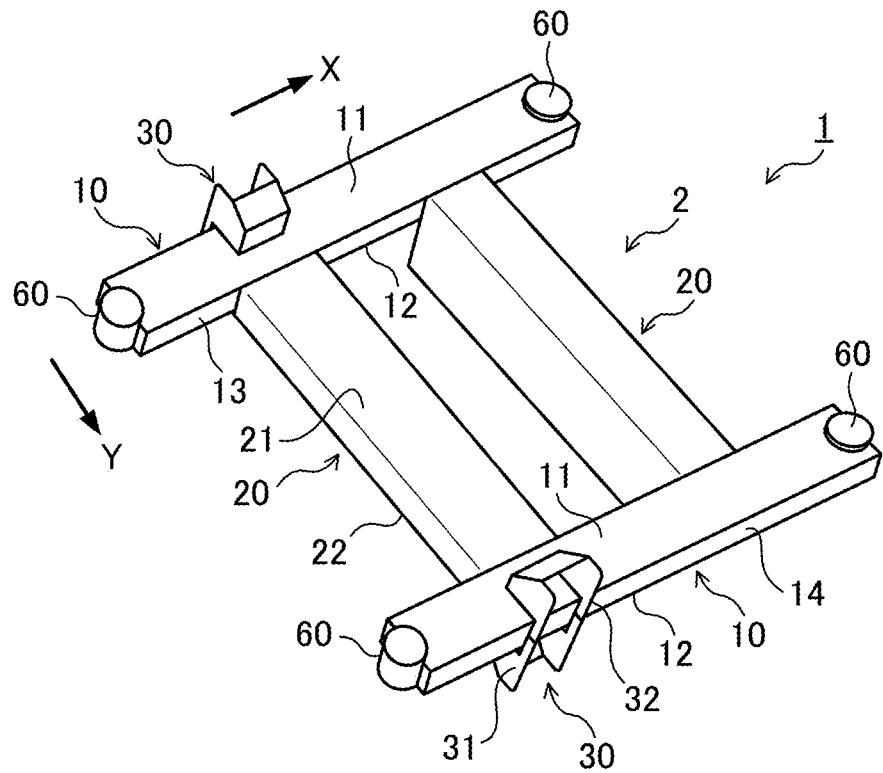
FIG. 3 is s perspective view illustrating an outline of an automobile suspension structure according to a first embodiment of the present invention.
Figure 4:
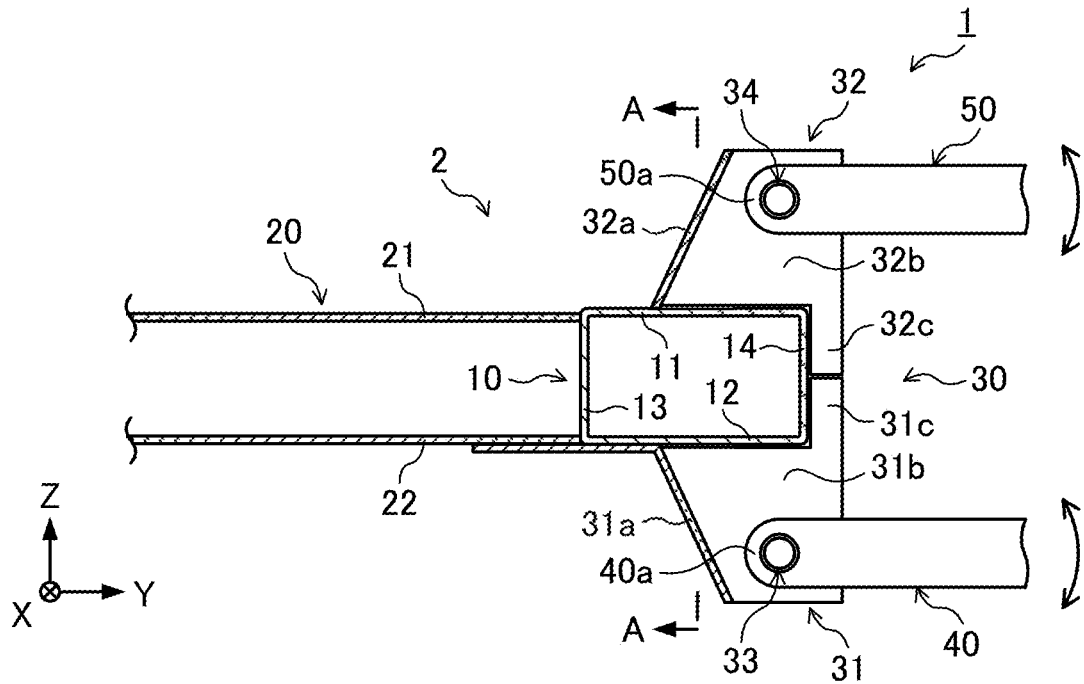
FIG. 4 is a view illustrating a periphery of a link attachment part, where a subframe is cut across the automobile length direction.
Figure 5:
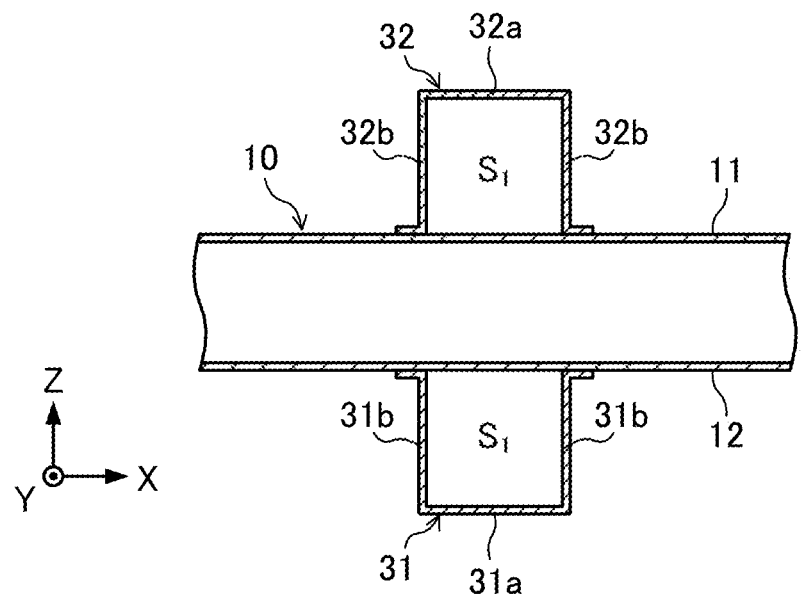
FIG. 5 is a view illustrating an A-A cross section (cross section across an automobile width direction) in FIG. 4.

FIG. 3 is a perspective view illustrating an outline of an automobile suspension structure 1 according to a first embodiment. FIG. 4 is a view illustrating a periphery of a link attachment part 30, where a subframe 2 is cut across the automobile length direction. FIG. 5 is a view illustrating an A-A cross section (cross section across the automobile width direction) in FIG. 4.

The automobile suspension structure 1 includes the subframe 2, a first link 40 (FIG. 4), and a second link 50 (FIG. 4).

The subframe 2 includes a pair of side members 10 extending in the automobile length direction (X direction), a pair of cross members 20 extending in the automobile width direction (Y direction), and link attachment parts 30 arranged to be continuous with ends of the cross member 20 in the automobile width direction.

The side member 10 is a hollow part made of a metal material such as a steel plate or an aluminum plate, for example. The side member 10 has an upper surface 11 and a lower surface 12 in the automobile height direction (Z direction), and an inner surface 13 and an outer surface 14 in the automobile width direction (Y direction). The side member 10 may be formed of one part formed by, for example, extrusion molding, or may be formed of two or more parts joined to each other.

The cross member 20 is a hollow part made of a metal material such as a steel plate or an aluminum plate, for example. The cross member 20 has an upper surface 21 and a lower surface 22 in the automobile height direction (Z direction). A pair of the cross members 20 is arranged between a pair of the side members 10, and the ends of the cross members 20 in the automobile width direction (Y direction) are joined to a pair of the side members 10 respectively. The cross member 20 may be formed of one part formed by, for example, extrusion molding, or may be formed of two or more parts joined to each other.

Incidentally, the side members 10 and the cross members 20 may be one part. The side members 10 and the cross members 20 may be integrally molded so that they form the shape of the Greek numeral "Π" when viewed from the automobile height direction, for example, and a cross-section along the automobile height direction of each of the bars has a groove shape with an opening in the automobile height direction. Further, at a place where rigidity is required, a closing plate may be arranged so as to cover the groove shape.

As illustrated in FIG. 4, the first link 40 and the second link 50, which are components of a suspension, are attached to the link attachment part 30. The link attachment part 30 in this embodiment includes a first bracket 31 to which the first link 40 is attached and a second bracket 32 to which the second link 50 is attached. The first bracket 31 and the second bracket 32 are formed of a metal material such as a steel plate or an aluminum plate, for example.

As illustrated in FIG. 5, the first bracket 31 has a hat-shaped portion including a top wall 31a and a pair of vertical walls 31b in a cross section across the automobile width direction (Y direction). Incidentally, the vertical walls 31b may be inclined with respect to the top wall 31a. The first bracket 31 has upper end portions of the vertical walls 31b joined to the lower surface 12 of the side member 10. As a result, a closed cross-sectional portion $S_1$ surrounded by the top wall 31a, a pair of the vertical walls 31b, and the lower surface 12 of the side member 10 is formed. As illustrated in FIG. 4, the first bracket 31 has projecting portions 31c extending upward from the vertical walls 31b at a position on the automobile outer side of the side member 10 in the automobile width direction. The projecting portions 31c are joined to the outer surface 14 of the side member 10.

Further, similarly to the first bracket 31, the second bracket 32 has a hat-shaped portion including a top wall 32a and a pair of vertical walls 32b in a cross section across the automobile width direction (Y direction). Incidentally, the vertical walls 32b may be inclined with respect to the top wall 32a. The second bracket 32 has lower end portions of the vertical walls 32b joined to the upper surface 11 of the side member 10. As a result, a closed cross-sectional portion $S_1$ surrounded by the top wall 32a, a pair of the vertical walls 32b, and the upper surface 11 of the side member 10 is formed. As illustrated in FIG. 4, the second bracket 32 has projecting portions 32c extending downward from the vertical walls 32b at a position on the automobile outer side of the side member 10 in the automobile width direction. The projecting portions 32c are joined to the outer surface 14 of the side member 10.

As above, the first bracket 31 is joined to the lower surface 12 and the outer surface 14 of the side member 10, and the second bracket 32 is joined to the upper surface 11 and the outer surface 14 of the side member 10. That is, the link attachment part 30 including the first bracket 31 and the second bracket 32 is joined to the upper surface 11, the lower surface 12, and the outer surface 14 of the side member 10.

The first bracket 31 has an inner end portion thereof in the automobile width direction (Y direction) joined to the lower surface 22 of the cross member 20. Therefore, the link attachment part 30 including the first bracket 31 is in a state of being arranged to be continuous from the end of the cross member 20 in the automobile width direction (Y direction). Incidentally, the cross member 20 and the first bracket 31 may be integrally molded. In this case, it is possible to bring the link attachment part 30 including the first bracket 31 into a state of being arranged to be continuous from the end of the cross member 20 in the automobile width direction (Y direction) without a step of joining the cross member 20 and the first bracket 31 together.

The link attachment part 30 includes a first link attachment part 33 to which the first link 40 is attached, and a second link attachment part 34 to which the second link 50 is attached. The first link attachment part 33 is arranged on the vertical wall 31b of the first bracket 31, and the second link attachment part 34 is arranged on the vertical wall 32b of the second bracket 32. That is, the first link attachment part 33 and the second link attachment part 34 are arranged with the side member 10 sandwiched therebetween in the automobile height direction (Z direction).

Further, the link attachment part 30 has the projecting portion 31c of the first bracket 31 and the projecting portion 32c of the second bracket 32 joined to each other. That is, the first link attachment part 33 arranged on the first bracket 31 and the second link attachment part 34 arranged on the second bracket 32 are connected via the link attachment part 30 joined to the outer surface 14 of the side member 10 in the automobile width direction (Y direction). Incidentally, the state where the projecting portion 31c and the projecting portion 32c are joined is not limited in particular, and the projecting portion 31c and the projecting portion 32c may be joined with their tips butted against each other, or may be joined with their tips overlapping each other when viewed from the automobile length direction (X direction).

An end portion 40a of the first link 40 is attached to the first link attachment part 33 so that the automobile length direction (X direction) serves as a rotation axis. In other words, the first link 40 is attached to the first link attachment part 33 so as to be pivotable in a plane across the automobile length direction. Incidentally, the first link 40 illustrated in FIG. 4 is, for example, a suspension toe control link.

An end portion 50a of the second link 50 is attached to the second link attachment part 34 so that the automobile length direction (X direction) serves as a rotation axis. In other words, the second link 50 is attached to the second link attachment part 34 so as to be pivotable in a plane across the automobile length direction. Incidentally, the second link 50 illustrated in FIG. 4 is, for example, a suspension upper link.

The automobile suspension structure 1 in the first embodiment is configured as above. In this automobile suspension structure 1, the link attachment parts 30, which are arranged to be continuous with the ends of the cross member 20 in the automobile width direction (Y direction), are each joined to the upper surface 11, the lower surface 12, and the outer surface 14 of the side member 10. Then, the first bracket 31 and the second bracket 32 are joined on the outer side of the side member 10 in the automobile width direction, to thereby establish a connection between the first link attachment part 33 and the second link attachment part 34.

In this automobile suspension structure 1, the link attachment part 30 connected to the cross member 20 is joined to the side member 10 so as to embrace the side member 10 from the outer side in the automobile width direction, to thereby make the connection state between the side member 10, the cross member 20, and the link attachment part 30 strong. As a result, the structure in which the side member 10, the cross member 20, and the link attachment part 30 are integrated is made, and local deformation of the link attachment part 30 is less likely to occur when a lateral force (force in the automobile width direction) is applied. That is, according to the automobile suspension structure 1 in this embodiment, it is possible to improve the rigidity more than the conventional suspension structure.

Incidentally, the configuration and the detailed shape of the link attachment part 30, or the form of the link attachment part 30 joined to the side member 10 and the cross member 20 is appropriately changed according to a suspension structure. In this embodiment, for example, the link attachment part 30 is formed of the first bracket 31 and the second bracket 32, but the configuration of the link attachment part 30 is not limited to this configuration.

Figure 6:
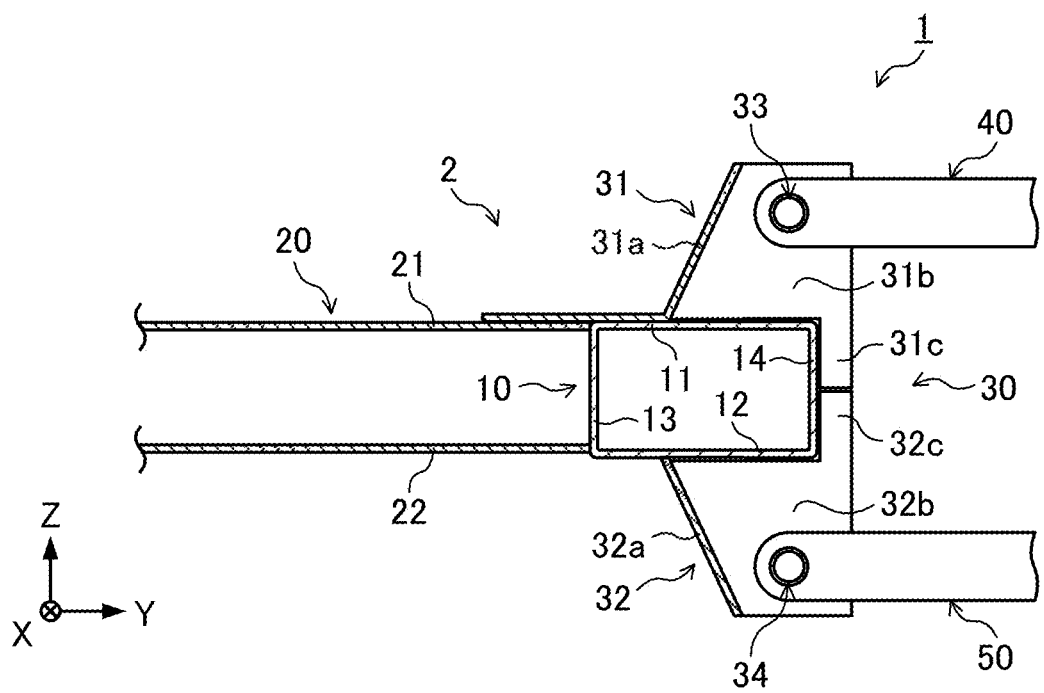
FIG. 6 is a view illustrating a configuration example of the link attachment part, where the subframe is cut across the automobile length direction.

Further, for example, the first link attachment part 33 may be arranged above the side member 10 as illustrated in FIG. 6. The first bracket 31 including the first link attachment part 33 in the example in FIG. 6 is joined to the upper surface 21 of the cross member 20 and the upper surface 11 and the outer surface 14 of the side member 10. Further, the second bracket 32 including the second link attachment part 34 is joined to the lower surface 12 and the outer surface 14 of the side member 10. In the configuration of the link attachment part 30 illustrated in FIG. 6, the first link 40 is, for example, a suspension upper link, and the second link 50 is, for example, a suspension toe control link.

Second Embodiment

Figure 7:
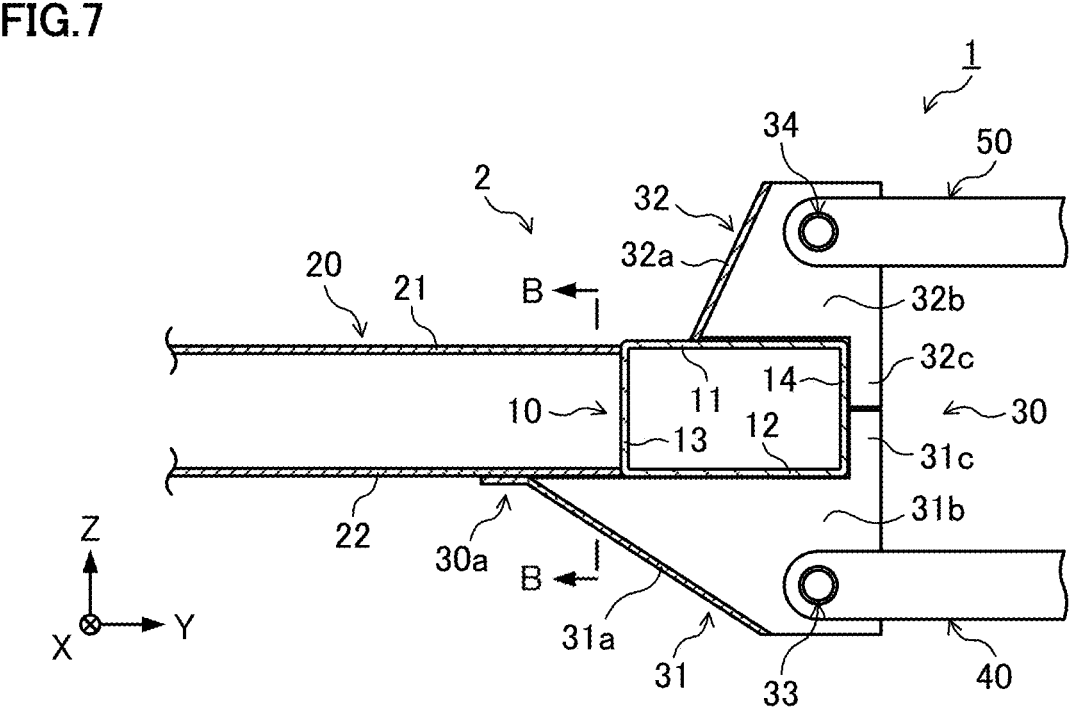
FIG. 7 is a view where the subframe is cut across the automobile length direction in an automobile suspension structure according to a second embodiment.
Figure 8:
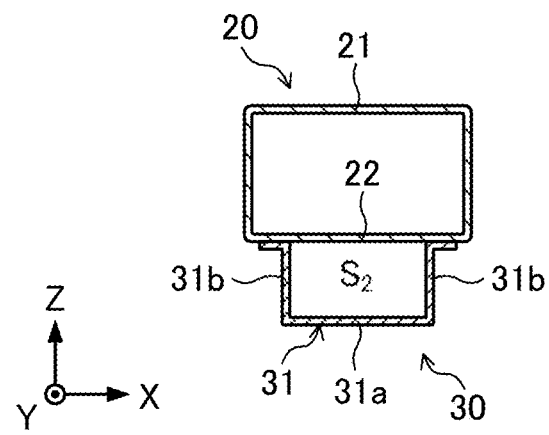
FIG. 8 is a view illustrating a B-B cross section (cross section across the automobile width direction) in FIG. 7.

FIG. 7 is a view where the subframe 2 is cut across the automobile length direction in an automobile suspension structure 1 according to a second embodiment. FIG. 8 is a view illustrating a B-B cross section (cross section across the automobile width direction) in FIG. 7.

The automobile suspension structure 1 in the second embodiment is different from that in the first embodiment in the shape of the first bracket 31 including the first link attachment part 33. The first bracket 31 has an inner end portion thereof in the automobile width direction (Y direction) located more inward in the automobile width direction than in the first embodiment. Therefore, when the subframe 2 is cut across the automobile width direction at the end of the cross member 20 in the automobile width direction, the cross-sectional shape of the first bracket 31 is hat-shaped. That is, in the second embodiment, a closed cross-sectional portion $S_2$ is formed by the top wall 31a and a pair of the vertical walls 31b of the first bracket 31 and the cross member 20.

That is, this automobile suspension structure 1 includes the closed cross-sectional portion $S_1$ (FIG. 5) formed by the side member 10 and the link attachment part 30 (FIG. 5) and the closed cross-sectional portion $S_2$ formed by the cross member 20 and the link attachment part 30 from the first link attachment part 33 to an end portion 30a of the link attachment part 30 in the automobile width direction (Y direction). According to the subframe 2 including the closed cross-sectional portion $S_1$ and the closed cross-sectional portion $S_2$ described above, it is possible to improve the rigidity of the automobile suspension structure 1, as will be described in later-described examples.

Third Embodiment

Figure 9:
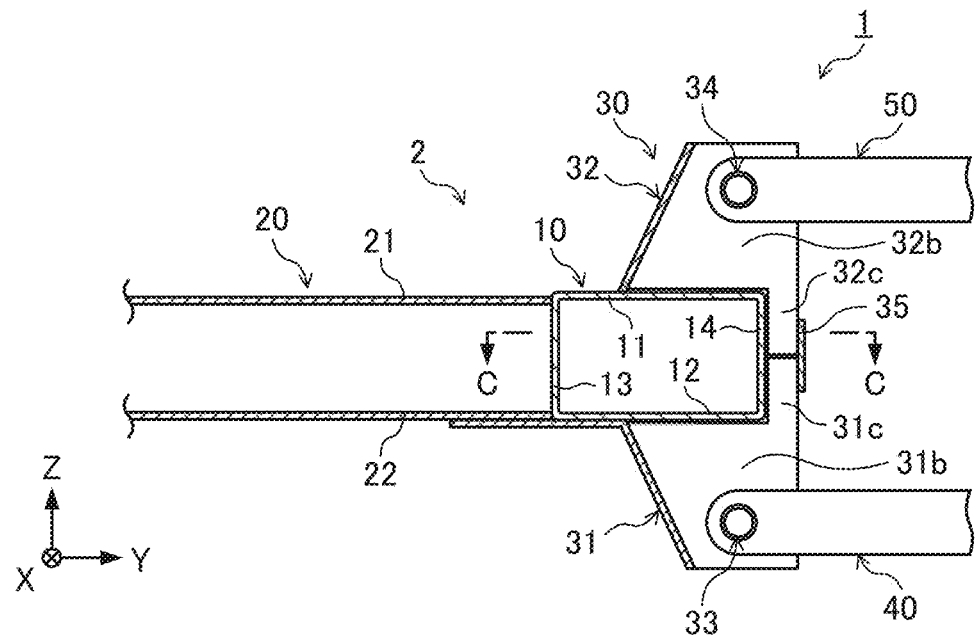
FIG. 9 is a view where the subframe is cut across the automobile length direction in an automobile suspension structure according to a third embodiment.
Figure 10:
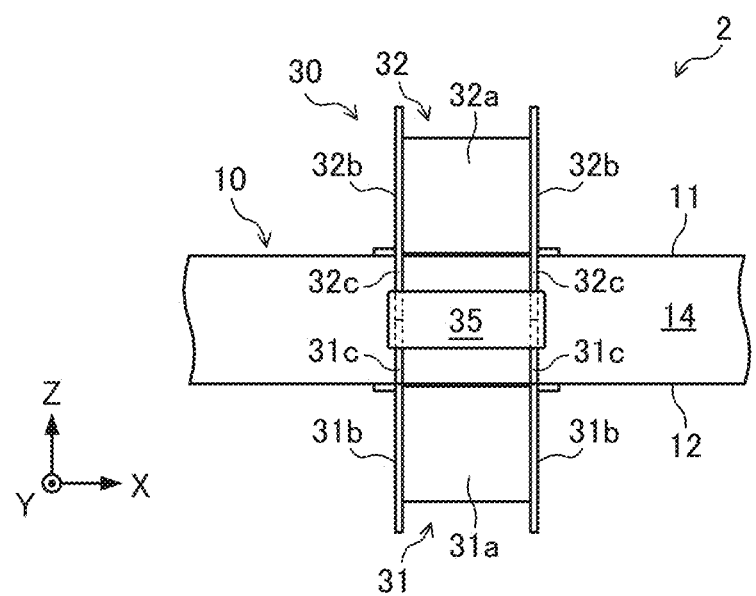
FIG. 10 is a view of the subframe viewed from the outer side in the automobile width direction.
Figure 11:
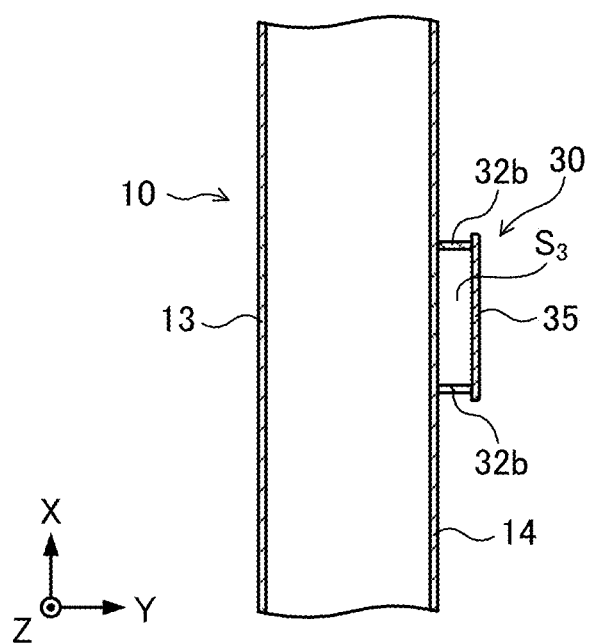
FIG. 11 is a view illustrating a C-C cross section (cross section across an automobile height direction) in FIG. 9.

FIG. 9 is a view where the subframe 2 is cut across the automobile length direction in an automobile suspension structure 1 according to a third embodiment. FIG. 10 is a view of the subframe 2 viewed from the outer side in the automobile width direction. FIG. 11 is a view illustrating a C-C cross section (cross section across the automobile height direction) in FIG. 9.

The automobile suspension structure 1 in the third embodiment includes the link attachment part 30 including a reinforcing part 35. The reinforcing part 35 illustrated in FIG. 9 to FIG. 11 is a metal plate such as a steel plate or an aluminum plate. The reinforcing part 35 is joined to a pair of the projecting portions 31c of the first bracket 31 and a pair of the projecting portions 32c of the second bracket 32 so as to bridge the projecting portions 31c and the projecting portions 32c.

By providing the above-described reinforcing part 35, a closed cross-sectional portion $S_3$ surrounded by the outer surface 14 of the side member 10 and the link attachment part 30 is formed in a cross section across the automobile height direction (Z direction) illustrated in FIG. 11. This makes the connection state between the first bracket 31 and the second bracket 32 strong, to make it possible to improve the rigidity of the automobile suspension structure 1. Further, from the viewpoint of effectively improving the rigidity of the automobile suspension structure 1, the closed cross-sectional portion $S_3$ is preferably provided near the portion of the first bracket 31 and the second bracket 32 being joined.

Incidentally, the reinforcing part 35 illustrated in FIG. 9 to FIG. 11 is a plate-shaped part, but the shape and the configuration of the reinforcing part 35 are not particularly limited as long as the closed cross-sectional portion $S_3$ can be formed. For example, the link attachment part 30 may be formed in a hat shape with the reinforcing part 35 serving as a top wall in a cross section across the automobile height direction (Z direction) illustrated in FIG. 11. Further, from the viewpoint of improving rigidity, the height of the reinforcing part 35 (length in the automobile height direction) is preferred to be high, but the height of the reinforcing part 35 is set appropriately to the extent that it does not interfere with the attachment of the first link 40 or the second link 50 to the link attachment part 30.

One example of the embodiment of the present invention has been explained above, but the present invention is not limited to such an example. It is apparent that those skilled in the art are able to devise various variation or modification examples within the scope of the technical spirit described in the claims, and it should be understood that such examples belong to the technical scope of the present invention as a matter of course.

EXAMPLES

<Simulation (1)>

Figure 12:
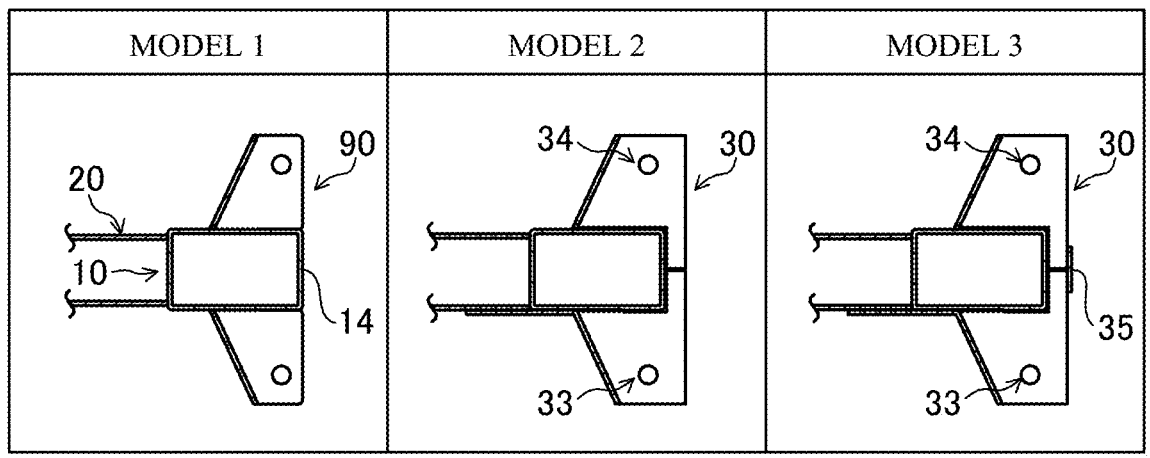
FIG. 12 is a schematic view of analysis models of Simulation (1).

A rigidity evaluation simulation was performed on such an automobile suspension structure 1 in parallel crosses as illustrated in FIG. 3. FIG. 12 is a schematic view of link attachment parts in analysis models.

Figure 2:
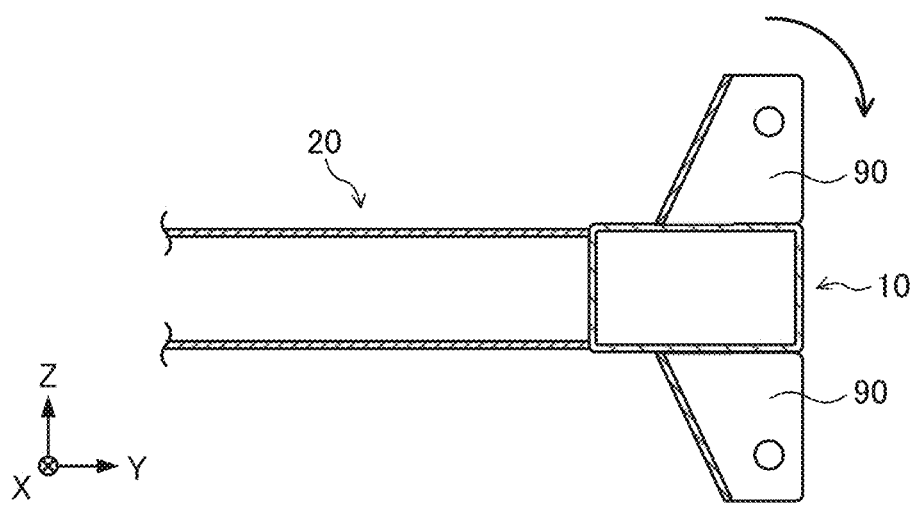
FIG. 2 is a view illustrating a periphery of a conventional link attachment part, where a subframe is cut across an automobile length direction.

Model 1 is a model as a comparative example in which the link attachment parts 90 are not joined to the outer surface 14 of the side member 10 as illustrated in FIG. 2. Model 2 is a model corresponding to the automobile suspension structure 1 in FIG. 4. Model 3 is a model corresponding to the automobile suspension structure 1 in FIG. 9, and is a model with the reinforcing part 35 added to Model 2. Incidentally, the configurations other than the link attachment part in the respective models are the same.

The simulation was performed under a condition that a load was applied to generate a lateral force (force in the automobile width direction) and torque about the axis in the automobile height direction in each link attachment part with all bushes 60 (FIG. 3) provided at the ends of the side members 10 using as restraint points. Then, from the simulation result, the rigidity against the force in the automobile width direction of the link attachment part (Rigidity 1) and the rigidity against the torsion about the axis in the automobile length direction (Rigidity 2) were evaluated.

Figure 13:
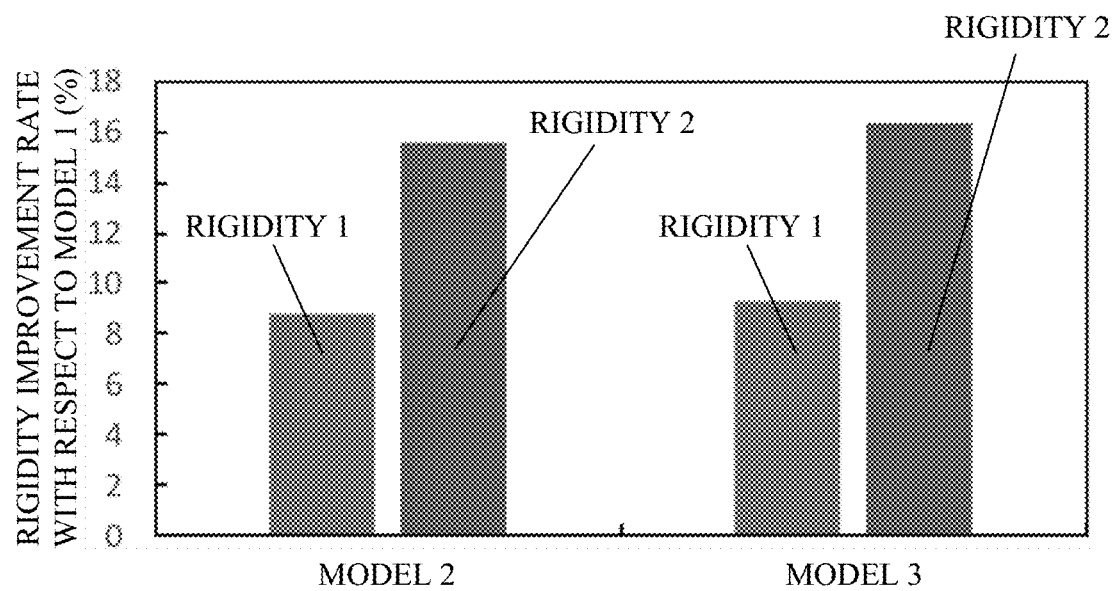
FIG. 13 is a chart illustrating a result of Simulation (1).

The simulation result is illustrated in FIG. 13. FIG. 13 illustrates the improvement rate of rigidity of Models 2 and 3 using the rigidity of Model 1 as a comparative example as a reference value. Incidentally, Rigidity 1 is the load (kN/mm) per unit deformation of the link attachment part in the automobile width direction (Y direction), and Rigidity 2 indicates the load (kN/mm) per unit deformation of the link attachment part in the rotation direction with the automobile length direction (X direction) serving as the rotation axis. As illustrated in FIG. 13, Models 2 and 3 were superior to Model 1 as a comparative example in the indexes of both Rigidity 1 and Rigidity 2. Further, Model 3 including the reinforcing part 35 was superior to Model 2 in the indexes of both Rigidity 1 and Rigidity 2.

<Simulation (2)>

Figure 14:
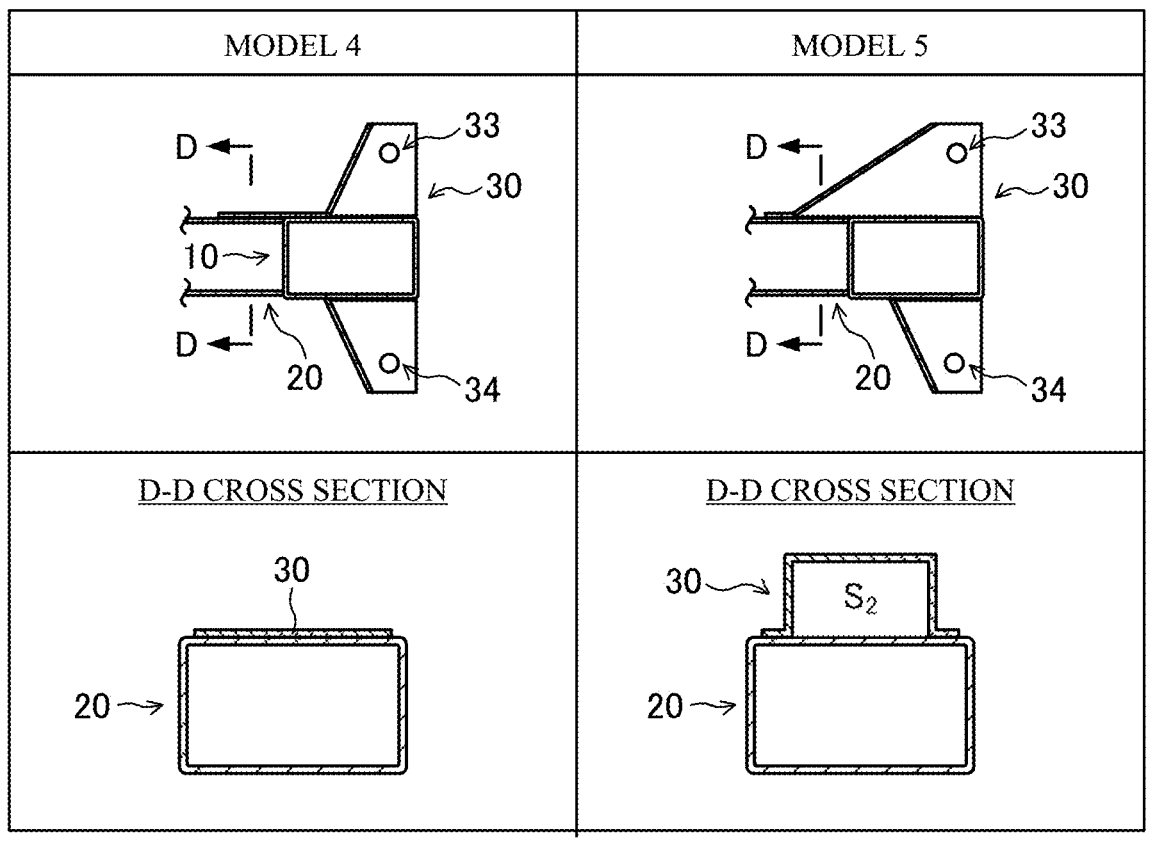
FIG. 14 is a schematic view of analysis models of Simulation (2).

A simulation was performed in analysis models illustrated in FIG. 14. Model 4 is a model in which the first link attachment part 33 and the second link attachment part 34 are not connected on the outer side of the side member 10 in the automobile width direction, with respect to the automobile suspension structure 1. Model 4 includes the previously-described closed cross-sectional portion $S_1$ (FIG. 5), but does not include the closed cross-sectional portion $S_2$ (FIG. 8). Model 5 is a model including both the closed cross-sectional portion $S_1$ and the closed cross-sectional portion $S_2$. Incidentally, the simulation condition is the same as that of Simulation (1) except for the configuration of the link attachment part.

Figure 15:
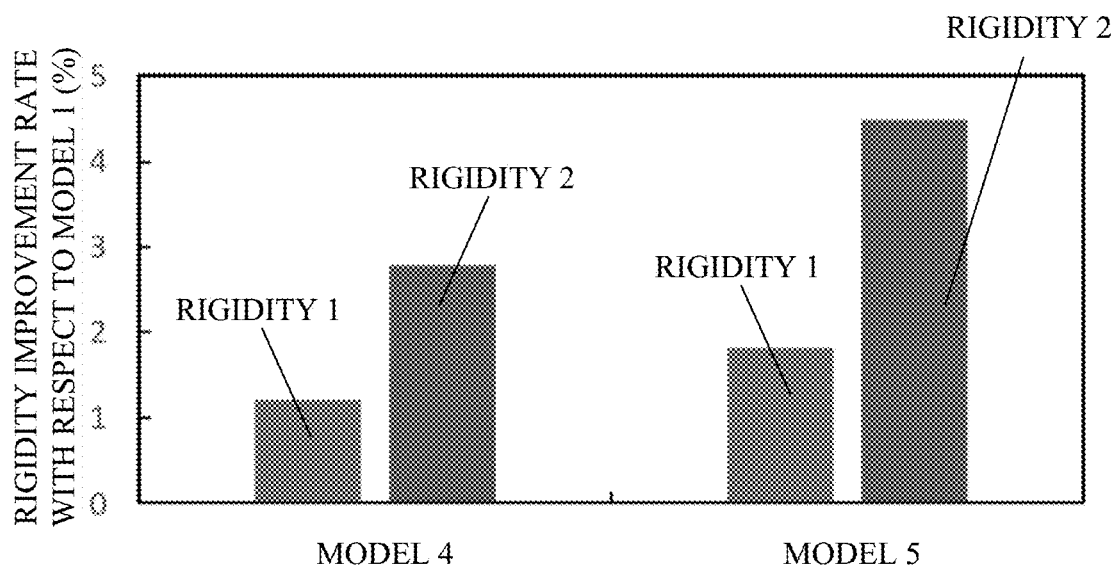
FIG. 15 is a chart illustrating a result of Simulation (2).

The simulation result is illustrated in FIG. 15. As illustrated in FIG. 15, the rigidity of Model 5 that includes the closed cross-sectional portion $S_2$ improves more than Model 4 that does not include the closed cross-sectional portion $S_2$. That is, from the viewpoint of improving rigidity, it is preferable to have the closed cross-sectional portion $S_2$ between the cross member 20 and the link attachment part 30.

Models 2 and 3 in Simulation (1) described previously do not include the closed cross-sectional portion $S_2$, but according to the result of Simulation (2), the rigidity is thought to further improve as long as the link attachment parts 30 in Models 2 and 3 have a shape including the closed cross-sectional portion $S_2$.

INDUSTRIAL APPLICABILITY

The present invention can be applied to an automobile suspension structure.

EXPLANATION OF CODES 1 automobile suspension structure
2 subframe
10 side member
11 upper surface
12 lower surface
13 inner surface
14 outer surface
20 cross member
21 upper surface
22 lower surface
30 link attachment part
30a inner end portion of link attachment part in automobile width direction
31 first bracket
31a top wall
31b vertical wall
31c projecting portion
32 second bracket
32a top wall
32b vertical wall
32c projecting portion
33 first link attachment part
34 second link attachment part
35 reinforcing part
40 first link
40a end portion of first link
50 second link
50a end portion of second link
60 bush
90 conventional link attachment part
$S_1$ closed cross-sectional portion
$S_2$ closed cross-sectional portion
$S_3$ closed cross-sectional portion

The invention claimed is:

1. An automobile suspension structure comprising:
a subframe; a first link; and a second link, wherein
the subframe includes:
a pair of side members;
a pair of cross members arranged between the pair of the side members; and
a link attachment part, the link attachment part is arranged to be continuous with an end of one cross member of the pair of cross members, the link attachment part is joined to an upper surface and a lower surface of one side member of the pair of the side members in an automobile height direction and an outer surface of the one side member in an automobile width direction, the link attachment part includes: a first bracket having a first link attachment part; and a second bracket having a second link attachment part, the first link attachment part and the second link attachment part are arranged with the one side member sandwiched therebetween in the automobile height direction, the first link attachment part and the second link attachment part are connected via the link attachment part joined to the outer surface of the one side member in the automobile width direction, the first bracket and the second bracket are joined to each other on an outer side of the one side member in the automobile width direction, the first link is attached to the first link attachment part so as to be pivotable in a plane across an automobile length direction, and the second link is attached to the second link attachment part so as to be pivotable in a plane across the automobile length direction.

2. The automobile suspension structure according to claim 1, wherein from the first link attachment part to an inner end portion of the link attachment part in the automobile width direction, a closed cross-sectional shape formed by the link attachment part and the one side member and a closed cross-sectional shape formed by the link attachment part and the one cross member are provided.

3. The automobile suspension structure according to claim 1 or claim 2, wherein a closed cross-sectional shape formed by the outer surface of the one side member in the automobile width direction and the link attachment part is provided.

* * * * *